Jan. 30, 1945.  J. A. BAKER  2,368,398

METHOD OF ENCASING MEAT OR THE LIKE

Filed Feb. 27, 1941

INVENTOR.
James A. Baker
BY Lieber & Lieber
ATTORNEYS.

Patented Jan. 30, 1945

2,368,398

UNITED STATES PATENT OFFICE 2,368,398

METHOD OF ENCASING MEAT OR THE LIKE

James A. Baker, Shorewood, Wis., assignor to Milprint, Inc., Milwaukee, Wis., a corporation of Delaware Application February 27, 1941, Serial No. 380,825

2 Claims. (Cl. 99—174)

The present invention relates in general to improvements in the art of packing diverse commodities for preserving and merchandising purposes, and relates more particularly to an improved method of encasing relatively pliant objects such as prepared meats in protective wrappers or casings.

An object of this invention is to provide a new and useful method of effectively encasing batches of meat or the like in protective casings.

It has long been common commercial practice to encase certain commodities such as ground meats, in various types of protective casings to form sausages or concealed loaves, and while some of these prior tubular casings were formed from parts of animal carcasses, others were made of seamless tubes of hydro-cellulose material. It is also customary when loading these prior tubular casings with either ground or solid pliable chunks of meat, to utilize a stuffing horn to the smaller end of which the casing end is applied, and through which the commodity may be ejected either by hand or machine, directly into the tubular casing, and the ends of the casings on opposite sides of the confined material were subsequently contracted and tied to provide sealed enclosures. In some instances, when these prior natural or artificial tubular casings were used, the confined commodity was smoked or otherwise treated after it was sealed within the casings thus degrading the wrapper; and if printed matter was to be applied to these wrappers, it was necessary because of the absorbent nature of the material, to use special inks or coloring matter and to definitely limit the extent of penetration of the casings, in order to prevent contamination of the product. Some of the prior tubular casings were also relatively thick and rather tough, thus producing final packages which were bulky, and having casings which were not sufficiently transparent to display the product and which could not be readily sliced. These prior artificial tubular wrappers were also highly objectionable because they were not moisture proof and therefore permitted escape of flavorful moisture and juices; and were moreover unsanitary because the cellulose could not be kept free from contamination by aerobic bacteria organisms during soaking and stuffing thereof, as these organisms would lodge in the pores of the absorbent casings and would be fed through these pores.

While the tubular form of casing and the use of a stuffing horn for loading, were quite satisfactory, it was attempted to obviate the difficulties of maintaining the prior cellulose casings taut and to eliminate undesirable looseness, by wrapping sheets of the cellulose film around batches of the meat and by sealing the overlapped edge portions of each sheet to form a sealed seam. Although this procedure obviated some of the stretching difficulty, the bulky seams produced by this wrapping method caused considerable difficulty during slicing of the finally enwrapped product, and the use of cellulose material still introduced various other objectionable features, such as hereinbefore referred to. This wrapping method also resulted in the production of successive packages which were not uniformly wrapped, since some wrappers were frequently applied looser than others due to careless workmanship.

It has been discovered, that these tubular meat casings may be formed of relatively inexpensive, lighter but more tenacious and moisture proof sheet material such for example as comprising a base material of rubber hydrochloride, which is capable of expansion when heated, but which also contacts within limits when cooled. This sheet material may be quickly converted into tubular casings devoid of bulky and objectionable seams and preparatory to convenient loading thereof in the ordinary manner, after printing and other decorative matter has been applied to the external surface thereof with any kind of ink or coloring material; and after the previously smoked or otherwise treated commodity has been injected into the improved heated and expansible casings, and the packages are permitted to cool and contract, the product will be far more snugly, uniformly and compactly confined and permanently preserved in moisture proof wrappers of a highly sanitary nature. The contraction of these improved casings into snug engagement with the pliant batches or objects has special utility and is especially advantageous, when encasing irregular objects such as moist pork hams, and the casing tubes can be readily formed from sheet material with minimum waste of stock by virtue of the fact that rubber hydrochloride is readily and effectively heat sealable to form a durable and relatively invisible seam. These casings may also be effectively cleansed and sterilized to eliminate detrimental bacteria, and to thus permanently protect and preserve the commodity.

It is therefore a more specific object of the present invention, to provide an improved method of packing moist and pliable batches of commodity such as pre-treated meat in durable and snug fitting tubular confining casings.

Another specific object of this invention is to provide a new method of forming tubular moisture proof commodity confining casings, and of introducing batches of material therein in a convenient and expeditious manner to produce an effective final sanitary and moisture resistant package.

A further specific object of the invention is to provide an improved method of packaging soft and pliant relatively irregular objects such as boneless pork hams dipped in coating material such as gelatine, and whereby comparatively air-free, palatable and attractive final packages will result.

Still another specific object of my invention is to provide an improved method of utilizing sheet material such as rubber hydrochloride which is adapted to be plasticized, sterilized and heat sealed, for the purpose of snugly and effectively encasing edible commodities containing considerable confined moisture but minimum quantities of free air.

An additional specific object of my present invention is to provide an improved meat packing process which can be expeditiously carried on either by hand or with simple apparatus, and which invariably results in the production of durable and effective final packages in which the product is efficiently concealed and confined for convenient and effective slicing.

Another specific object of the invention is to provide a new method of packing meat or the like in impervious moisture proof wrappers devoid of possible contamination by aerobic bacteria organisms, and from which juices and flavors cannot escape.

These and other specific objects and advantages of the invention will be apparent from the following description.

A clear conception of the several steps constituting the improved packing method, and of the general construction and mode of utilizing apparatus for expediting the exploitation of the method, may be had by referring to the drawing accompanying and forming part of this specification, wherein like reference characters designate the same or similar parts in the various views.

Although the present improved method has been described herein as being particularly applicable to advantage in the packing of gelatine coated batches of meat, it is not my desire or intent to thereby unnecessarily limit the scope or utility of the invention as applied to other commodities.

Figure 1:
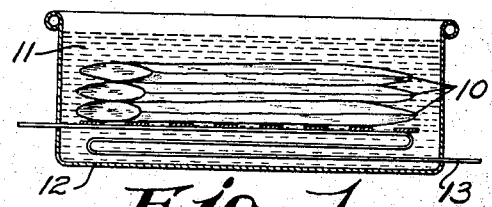
Fig. 1 is a diagram depicting the initial step of preparing the tubular casings for stuffing by heating the same to a predetermined extent in clean liquid.

Referring to the drawing, when utilizing my present improved method for the purpose of wrapping batches of commodity such as moist meat, in successive tubular casings, the empty casings 10 after having been formed of transparent moisture proof heat-sealable sheet material such as rubber hydrochloride with very narrow and neat heat sealed seams extending longitudinally thereof, should preferably be initially placed in clean water 11 confined within a reservoir 12 having a heating coil 13 or other means for heating the water to a temperature of approximately 160° F., as shown in Fig. 1. The temperature of the water 11 may range in temperature from 120° F. to 180° F., but the time of immersion should be varied accordingly, and when a temperature of 160° F. is employed, the empty tubular casings should be permitted to soak for a period of anywhere from thirty seconds minimum, to five minutes maximum time, in order to insure proper flexibility, expansibility or stretchability, to prevent discoloration, and to eliminate undesirable breakage when stretched.

Figure 2:
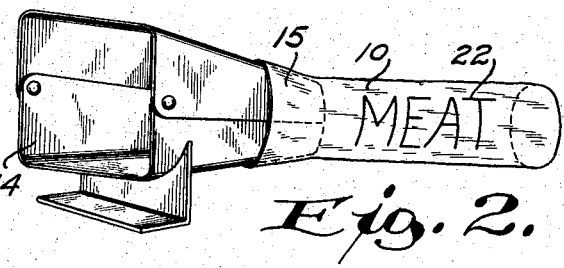
Fig. 2 is a diagrammatic perspective view showing one of the heated tubular casings initially stretched and applied to a stuffing horn.
Figure 3:
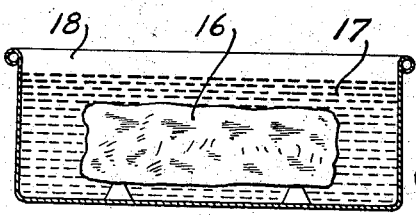
Fig. 3 is another diagram illustrating the step of dipping a batch of meat or the like in liquid gelatine.
Figure 4:
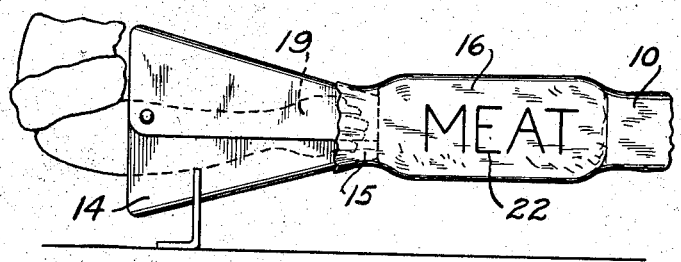
Fig. 4 is a side view depicting the step of manually stuffing the gelatine treated batch into a pretreated casing.

The successive tubular transparent casings 10 may be removed from the heating reservoir 12 and applied to a stuffing horn 14 as shown in Fig. 2, with one end of the heated casing 10 stretched over the expansible tapered delivery end 15 of the horn 14. The successive batches 16 of meat or other commodity may be dipped into gelatine or other treating solution 17 confined within a vat 18 as illustrated in Fig. 3, and the treated batches may thereafter be forced through the stuffing horn 14 and into the heated casing 10 embracing the horn end 15, in any convenient manner, as by means of an operator's hand 19 as illustrated in Fig. 4. The gelatine will cause the batches 16 to advance freely through the horn 14, and the tapered walls of this horn will compress the commodity and force the gelatin into the voids of the meat; and when the plastic mass emerges from the horn delivery end 15, it will expand and stretch the expansible tubular heated casing 10 while at the same time advancing it slightly away from the horn 14. The operator may use his idle hand to control this latter movement, and should see that the batch 16 is finally located approximately centrally of the wrapper casing 10.

Figure 5:
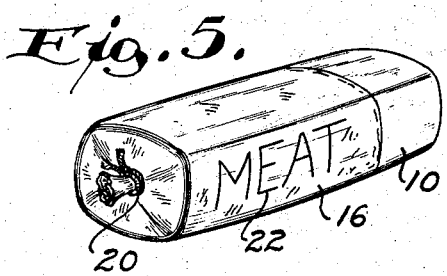
Fig. 5 is a somewhat enlarged perspective view of a meat laden casing removed from the stuffing horn and having one end gathered and firmly tied.
Figure 6:
Fig. 6 is a similarly enlarged side elevation of the package with both ends gathered and finally tied.

After each tubular casing 10 has been thus initially loaded while in heated and stretched condition, it may be removed from the stuffing horn 14 and the ends thereof may be gathered snugly together and tightly sealed by tying with durable cords 20 as shown in Figs. 5 and 6. This gathering and tying should be effected as close to the opposite ends of the confined batches 16 as possible so as to eliminate confinement of excessive air and to cause the gelatine to completely fill the end zones, and should also preferably be effected before final cooling of the package. The moist commodity with all of its juices and flavors intact, will thus be hermetically sealed in a moisture proof casing 10 the interior of which is sterilized and clean, and as this casing cools it will contract and snugly embrace the confined batch 16.

Figure 7:
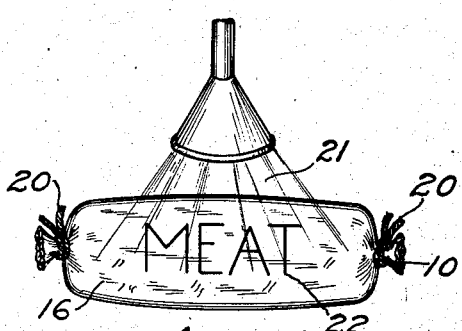
Fig. 7 is a view showing the step of washing the package with fresh liquid.
Figure 8:
Fig. 8 is a similar view depicting the final step of drying the final package with a clean cloth.

The finally sealed packages may thereafter be subjected to a spray 21 of clean and cool liquid such as fresh water, as illustrated in Fig. 7, in order to finally shrink the casing 10 and to remove impurities. After thorough washing and cooling has been thus effected, the package may be dried with a clean cloth 23 as shown in Fig. 8, thus completing the entire packing operation. It is preferable with my improved method, to smoke or otherwise condition the batches 16 before they are concealed within the tubular casings 10, so that no other treatment is necessary before final utilization or consumption, although the commodity may be boiled or cooked in the wrapper just prior to final removal. The casings 10 which are formed of transparent moisture proof impervious sheet material may also be tinted, decorated, or provided with suitable lettering 22, before they are formed into tubes of desired length; and the sealing seams may be produced by applying heat to relatively narrow overlapped edge portions of the sheets, thus producing durable seams which are hardly visible and will not interfere with subsequent slicing of the commodity.

From the foregoing detailed description, it will be apparent that the present invention provides an extremely simple, yet highly efficient method of encasing successive batches of moist and pliant commodity such as meats, in moisture proof tubular casings 10 which effectively protect and preserve the finally wrapped product. The tubular casings 10 which are preferably formed of rubber hydrochloride sheeting or other material having similar characteristics, may be readily sealed to avoid bulky and objectionable seams, is moisture proof and impervious thus eliminating ingress of air and escape of moisture, may be readily treated for elimination of destructive bacteria, and can be initially expanded by contact with the product and thereafter permitted to ultimately shrink into snug contact with the confined commodity. The improved method can be quickly and effectively carried on by a novice to produce uniform and very attractive successive packages, and has in fact proven highly successful in actual commercial use. The improved packages will retain their shape and will not burst, even when roughly handled, due to the tenacious character of the wrapping sheets, and the tubular casings 10 may be quickly loaded with the aid of an ordinary stuffing horn so as to effectively expel air from the final commodity. The batches 16 or other objects encased with this method may be of diverse size and shape, and although the invention has proven especially applicable to moist meats, it may be utilized for packing diverse materials. The extent of heating of the casings 10 may also be varied throughout a considerable range, but should be sufficient to produce proper sterilization and expansibility, without degrading these casings.

Applicant has discovered that the rubber hydrochloride tubular casing contemplated by the invention, is made pliant and more elastic by the application of moist heat as for example by immersion in a liquid or water bath, so that the casing is rendered capable of expansion by stretching. After cooling the casing will contract slightly so as to shrink about and snugly engage the enclosed commodity. A casing having a circumference of twelve inches after the application of moist heat in accordance with the present improvements, may be stuffed with a product of any cross-sectional configuration, having a maximum circumference or peripheral dimension as high as thirteen and one-half inches. A casing having a peripheral dimension from fifteen to eighteen inches is attended by shrinkage of from 2 to 3 per cent of its expanded size, directed laterally or radially of the longitudinal axis of the empty package. This has been found sufficient to insure that the casing will hug the meat without compressing, deforming or unduly constricting the product. The entire amount of shrinkage of the filled and packed casing is relatively slight within limits above defined, but is sufficient to fill all the meat depressions, so as to closely conform to the meat contour. The high spots of the meat serve to expand the heated casing during the stuffing operation. The resulting shrinkage, preferably by a definite applied cooling step, contracts the casing so as to hug the meat behind the high spots in respect to the direction of the stuffing operation. This results in a very snugly fitting casing on the meat package, preferably enhanced by the gelatin coating step of the process, so that all portions of the packed meat commodity contact the inner surface of the tube, so as to insure against the presence of any internal air spaces, the presence of which might be conducive to the propagation and dissemination of aerobic bacteria.

The moist heat is applied according to the instant improvements so as to render the rubber hydrochloride tubing pliant and expansible for stuffing purposes. In other words, the heating step as by immersion in a liquid or water bath, does not in itself expand the casing. Rather it renders the casing expansible or incorporates characteristics of expansibility thereto, so that the operation of inserting the meat within the tube will expand or stretch the casing to the desired extent.

It should be understood that it is not desired to limit the present invention to the exact steps of the method, or to the precise apparatus, described and shown herein, for various modifications within the scope of the claims may occur to persons skilled in the art.

I claim:

1. The method of packing meat, comprising immersing and soaking a tubular open ended casing composed of rubber hydrochloride in a liquid heating medium maintained at a temperature ranging substantially between 120° and 180° Fahr. for a time interval ranging from 30 seconds to 5 minutes to impart to the casing increased characteristics of flexibility and expansibility, stuffing into the medial portion of said heated open ended tubular casing from one end thereof a self-contained batch of meat having a transverse dimension greater than the normal transverse dimension of the casing to expand said heated casing, then securing the opposite open ends of the tubular casing in close engagement with the ends of the confined meat batch, and finally cooling the stuffed meat filled casing to shrink the expanded casing into snug conforming engagement with the enclosed meat batch to insure against the presence of bacteria propagating air spaces within the sealed package.

2. The method of packing meat, comprising immersing and soaking a heat sealed open ended tubular casing composed of rubber hydrochloride in a bath of hot water maintained at a temperature ranging substantially between 120° and 180° Fahr. for a time interval ranging from thirty seconds to five minutes to impart to the casing increased characteristics of flexibility and expansibility, applying a coating of gelatin to a self-contained batch of meat having a transverse dimension greater than the normal transverse dimension of the casing so as to fill all voids in the meat batch with gelatine and render the batch of smooth uniform dimension, stuffing into the medial portion of said tubular open ended heated casing from one end thereof said gelatine coated batch of meat to expand said heated casing, then tying the opposite open ends of the tubular casing into snug engagement with the opposite ends of the confined meat batch, and finally spraying cold water on the stuffed meat filled casing to chill and shrink the expanded casing into smooth and snug contacting and conforming engagement with the enclosed gelatine coated meat batch to insure against the presence of bacteria propagating air spaces within the sealed package.

JAMES A. BAKER.